(12) United States Patent
Kim

(10) Patent No.: US 11,505,183 B2
(45) Date of Patent: Nov. 22, 2022

(54) DRIVER ASSISTANCE SYSTEM AND METHOD

(71) Applicant: MANDO CORPORATION, Pyeongtaek-si (KR)

(72) Inventor: Hyun Beom Kim, Seoul (KR)

(73) Assignee: HL Klemove Corp., Incheon (KR)

( * ) Notice: Subject to any disclaimer, the term of this patent is extended or adjusted under 35 U.S.C. 154(b) by 115 days.

(21) Appl. No.: 16/737,294

(22) Filed: Jan. 8, 2020

(65) Prior Publication Data
US 2020/0247397 A1 Aug. 6, 2020

(30) Foreign Application Priority Data
Feb. 1, 2019 (KR) ......................... 10-2019-0014039

(51) Int. Cl.
*B60W 30/09* (2012.01)
*G08G 1/16* (2006.01)
*B60W 30/095* (2012.01)
*G01S 17/931* (2020.01)

(52) U.S. Cl.
CPC .......... *B60W 30/09* (2013.01); *B60W 30/095* (2013.01); *G08G 1/163* (2013.01); *G08G 1/166* (2013.01); *G01S 17/931* (2020.01)

(58) Field of Classification Search
CPC ...... B60W 10/18; B60W 10/20; B60W 30/09; B60W 30/095; B60W 30/0956; G01S 13/867; G01S 2013/9318; G01S 2013/93185; G08G 1/16; G08G 1/163; G08G 1/166
See application file for complete search history.

(56) References Cited

U.S. PATENT DOCUMENTS

| 5,485,892 A * | 1/1996 | Fujita .................. G05D 1/0255 180/167 |
| 8,676,443 B2 | 3/2014 | Han et al. |
| 2004/0193351 A1 * | 9/2004 | Takahashi ................ B60T 7/22 701/70 |

(Continued)

FOREIGN PATENT DOCUMENTS

KR 10-1834351 A 3/2018

*Primary Examiner* — Anshul Sood
(74) *Attorney, Agent, or Firm* — Morgan, Lewis & Bockius LLP

(57) ABSTRACT

A driver assistance system and method are disclosed. The driver assistance system includes a first sensor installed at a vehicle and configured to have a field of view directed forward from the vehicle to acquire front image data, a second sensor selected from a group of radar and LIDAR sensors, installed at the vehicle, and configured to have a field of view directed forward from the vehicle to acquire front detection data, and a controller having a processor configured to process the front image data and the front detection data, wherein the controller is configured to detect a lane, in which the vehicle is traveling, or detect a front object located in front of the vehicle, in response to the processing of the image data and the front detection data, output a braking signal to a braking system of the vehicle when a collision between the vehicle and the front object is expected, and output a steering signal to a steering system of the vehicle when a collision between the vehicle and the front object is expected even with braking control.

19 Claims, 7 Drawing Sheets

(56) References Cited

U.S. PATENT DOCUMENTS

| | | | | |
|---|---|---|---|---|
| 2010/0211235 A1* | 8/2010 | Taguchi | ............... | B60T 8/1755 |
| | | | | 701/1 |
| 2016/0349364 A1* | 12/2016 | Hara | ..................... | G01S 13/867 |
| 2017/0210382 A1* | 7/2017 | Nishimura | ............ | B60W 30/09 |
| 2019/0064829 A1* | 2/2019 | Ozawa | ................ | G05D 1/0214 |

* cited by examiner

DRIVER ASSISTANCE SYSTEM AND METHOD

CROSS-REFERENCE TO RELATED APPLICATION

This application is based on and claims priority under 35 U.S.C. § 119 to Korean Patent Application No. 10-2019-0014039 filed on Feb. 1, 2019, in the Korean Intellectual Property Office, the disclosure of which is incorporated herein by reference in its entirety.

BACKGROUND

1. Field of the Invention

The present disclosure relates to a driver assistance system, and more particularly, to a driver assistance system capable of avoid forward collisions.

2. Discussion of Related Art

Vehicles are transportation means that run on the roads or tracks using fossil fuel, electricity, etc., for their power sources. In modern society, vehicles are the most common transportation means, and people using the vehicles are ever increasing.

To relieve burdens and increase convenience of the driver, recent studies on vehicles equipped with a Driver Assistance System (DAS) that actively provides information about a state of the vehicle, a state of the driver, and surrounding conditions are ongoing actively.

As an example of the DAS equipped in the vehicle, there are Forward Collision Avoidance (FCA), Autonomous Emergency Brake (AEB), Driver Attention Warning (DAW), etc. These systems are collision avoidance and alert systems that determine the risk of colliding with an object while the vehicle is traveling on the road and apply urgent braking in a situation of the collision.

However, the conventional AEB system of a vehicle is only able to avoid a collision with a car proceeding in the longitudinal direction of the vehicle, but has limitations in that it has difficulty in avoiding a collision in a situation where emergency braking needs to be applied along with lateral control for the vehicle.

Accordingly, a need exists for a technology to reduce accidents by overcoming the limitations of the AEB system to extensively apply it in terms of usability.

SUMMARY OF THE INVENTION

The present disclosure provides a driver assistance system enabling lateral control to be performed along with braking control when there is an obstacle in front of the vehicle and it is impossible to avoid the obstacle only with the braking control, thereby reducing the risk of colliding with the obstacle.

The present disclosure also provides a control method, which enables lateral control of a vehicle in a lane to avoid an obstacle, thereby preventing secondary collisions with nearby vehicles in other lanes.

In accordance with an aspect of the present disclosure, a driver assistance system is provided. The driver assistance system includes a first sensor installed at a vehicle and configured to have a field of view directed forward from the vehicle to acquire front image data; a second sensor selected from a group of radar and LIDAR sensors, installed at the vehicle, and configured to have a field of view directed forward from the vehicle to acquire front detection data; and a controller having a processor configured to process the front image data and the front detection data, wherein the controller is configured to detect a lane, in which the vehicle is traveling, or detect a front object located in front of the vehicle, in response to the processing of the image data and the front detection data, output a braking signal to a braking system of the vehicle when a collision between the vehicle and the front object is expected, and output a steering signal to a steering system of the vehicle when a collision between the vehicle and the front object is expected even with braking control.

When a collision between the vehicle and the front object is expected, the controller may output a steering signal to the steering system of the vehicle in order for the vehicle to avoid the collision with the front object and stay in the lane, in which the vehicle is traveling.

The controller may calculate a yaw rate required for the vehicle to avoid a collision with the front object and stay in the lane, in which the vehicle is traveling.

The controller may output a steering signal to the steering system of the vehicle and output a braking signal to the braking system of the vehicle, in order for the vehicle to avoid a collision with the front object and stay in a predetermined area in the lane, in which the vehicle is traveling.

The controller may determine the predetermined area, which is narrower than an area having width of the lane and length of a distance between the vehicle and the front object.

The controller may calculate a yaw rate in real time, the yaw rate being required for the vehicle to travel to stay in the predetermined area.

The controller may output a steering control signal changed according the yaw rate calculated in real time to the steering system.

The controller may expect a collision between the vehicle and the front object based on a distance to the front object and relative speed of the front object.

In accordance with another aspect of the present disclosure, a driver assistance method is provided. The driver assistance method includes using a camera installed at a vehicle and having a field of view directed forward from the vehicle to acquire front image data of the vehicle; using a front radar installed at a vehicle and having a field of view directed forward from the vehicle to acquire front radar data of the vehicle; detecting a lane, in which the vehicle is traveling, or detecting a front object located in front of the vehicle, in response to processing of the image data and the front radar data; putting a brake on the vehicle when a collision between the vehicle and the front object is expected; and changing a traveling direction of the vehicle when a collision between the vehicle and the front object is expected even with the braking of the vehicle.

The driver assistance method may further include, when a collision between the vehicle and the front object is expected, changing the traveling direction of the vehicle to avoid the collision with the front object and stay in the lane, in which the vehicle is traveling.

The driver assistance method may further include calculating a yaw rate required for the vehicle to avoid a collision with the front object and stay in the lane, in which the vehicle is traveling.

The driver assistance method may further include changing a traveling direction of the vehicle and putting a brake on the vehicle, in order for the vehicle to avoid a collision with the front object and stay in a predetermined area in the lane, in which the vehicle is traveling.

The driver assistance method may further include calculating a yaw rate in real time, the yaw rate being required for the vehicle to travel to stay in the predetermined area.

The driver assistance method may further include outputting a steering control signal changed according the yaw rate calculated in real time to the steering system.

The driver assistance method may further include expecting a collision between the vehicle and the front object based on a distance to the front object and relative speed of the front object.

In accordance with an aspect of the present disclosure, a driver assistance system is provided. The driver assistance system includes a first sensor installed at a vehicle and configured to have a field of view directed forward from the vehicle to acquire front image data; a second sensor selected from a group of radar and LIDAR sensors, installed at the vehicle, and configured to have a field of view directed forward from the vehicle to acquire front detection data; a processor configured to process the front image data and the front; and a memory storing instructions. The instructions, when executed by the processor, cause the processor to detect a lane, in which the vehicle is traveling, or detect a front object located in front of the vehicle, in response to the processing of the image data and the front detection data, output a braking signal to a braking system of the vehicle when a collision between the vehicle and the front object is expected, and output a steering signal to a steering system of the vehicle when a collision between the vehicle and the front object is expected even with braking control.

The instructions may further cause to, when a collision between the vehicle and the front object is expected, output a steering signal to the steering system of the vehicle in order for the vehicle to avoid the collision with the front object and stay in the lane, in which the vehicle is traveling.

The instructions may further cause to output a steering signal to the steering system of the vehicle and output a braking signal to the braking system of the vehicle, in order for the vehicle to avoid a collision with the front object and stay in a predetermined area in the lane, in which the vehicle is traveling, the predetermined area is narrower than an area having width of the lane and length of a distance between the vehicle and the front object.

The instructions may further cause to calculate a yaw rate in real time, the yaw rate being required for the vehicle to travel to stay in the predetermined area.

The instructions may further cause to output a steering control signal changed according the yaw rate calculated in real time to the steering system.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
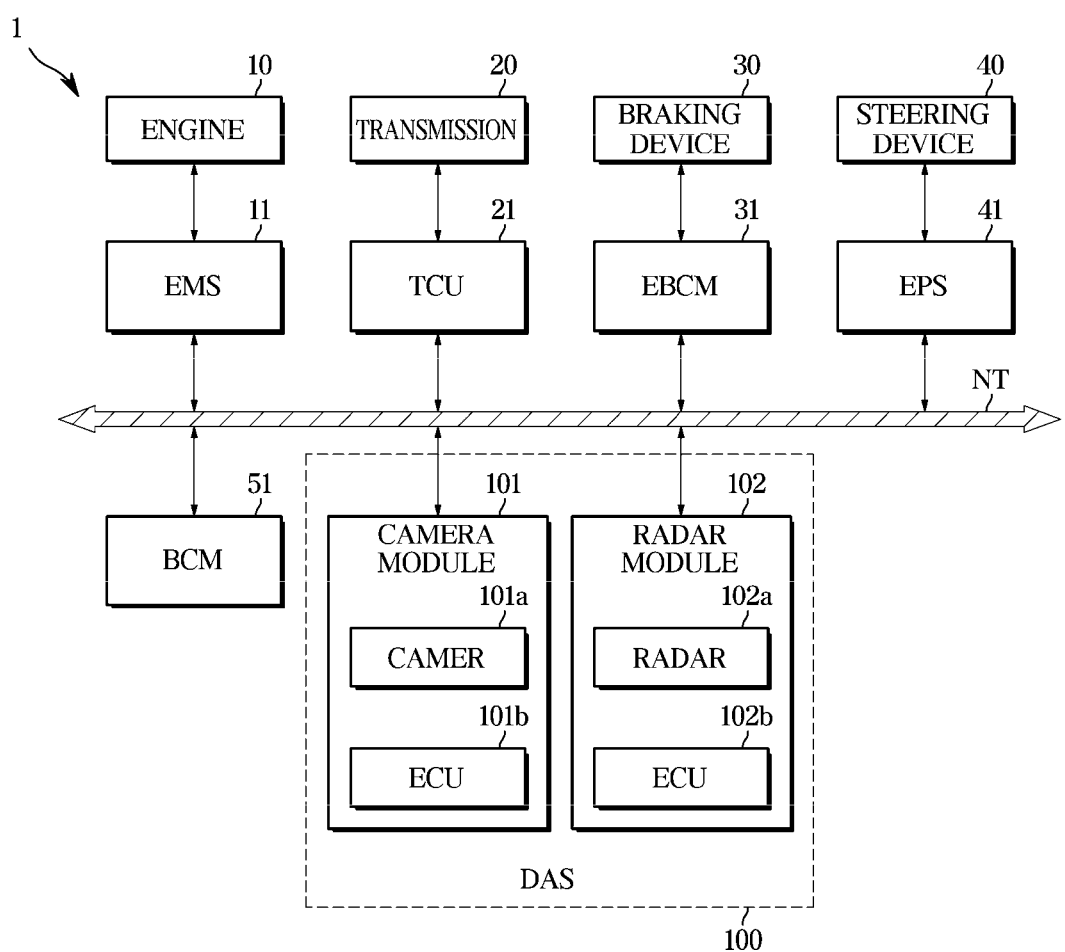
FIG. 1 is a block diagram of a vehicle, according to an embodiment of the present disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the present disclosure will now be described with reference to accompanying drawings.

FIG. 1 is a block diagram of a vehicle, according to an embodiment of the present disclosure.

Referring to FIG. 1, a vehicle 1 may include an engine 10, a transmission 20, a braking device 30, and a steering device 40. The engine 10 may include a cylinder and a piston to generate power to drive the vehicle 1. The transmission 20 may include a plurality of gears to transmit the power generated by the engine 10 to car wheels. The braking device 30 may slow down or stop the vehicle 1 through friction with the car wheels. The steering device 40 may change driving directions of the vehicle 1.

The vehicle 1 may include a plurality of electronic parts. For example, the electronic parts of the vehicle 1 may include an Engine Management System (EMS) 11, a Transmission Control Unit (TCU) 21, an Electronic Brake Control Module (EBCM) 31, an Electronic Power Steering (EPS) 41, a Body Control Module (BCM) 51, and a Driver Assistance System (DAS) 100.

The EMS 11 may control the engine 10 in response to the driver's acceleration intention executed on the accelerator pedal or a request of the DAS 100. For example, the EMS 11 may control torque of the engine 10.

The TCU 21 may control the transmission 20 in response to a gearshift command from the driver through a transmission lever and/or driving speed of the vehicle 1. For example, the TCU 21 may control a transmission gear ratio from the engine 10 to the car wheels.

The EBCM 31 may control the braking device 30 in response to the driver's braking intention executed on the brake pedal and/or slip of the car wheels. For example, the EBCM 31 may temporarily release braking on the car wheels in response to the slip of the car wheels detected when the vehicle 1 applies the brakes (Anti-lock Braking Systems (ABS)). The EBCM 31 may selectively release braking on the car wheels in response to oversteering and/or understeering detected while the vehicle 1 is steered (Electronic Stability Control (ESC)). Furthermore, the EBCM 31 may temporarily put a brake on the car wheels in response to the slip of the car wheels detected when the vehicle 1 is driven (Traction Control System (TCS)).

The EPS 41 may assist operation of the steering device 40 for the driver to easily manipulate the steering wheel, in response to the driver's steering intention executed on the steering wheel. For example, the EPS 41 may assist operation of the steering device 40 to reduce steering power during low-speed driving or parking and increase steering power during high-speed driving.

The EPS 41 in accordance with an embodiment is driven by an electric motor, so it is also called a Motor Driven Power Steering system (MDPS).

The BCM 51 may provide convenience for the driver or control operation of electronic parts in charge of securing safety of the driver. For example, the BCM 51 may control headlamps, wipers, clusters, multi-functional switches, and turn indicator lamps.

The DAS 100 may assist the driver in manipulating (driving, braking, steering) the vehicle 1. For example, the DAS 100 may detect surrounding environments of the vehicle 1 (e.g., other vehicles, pedestrians, cyclists, lanes, road signs), and in response to the detected surrounding environment, control driving, braking, and/or steering the vehicle 1.

The DAS 100 may provide various functions for the driver. For example, the DAS 100 may provide lane departure warning (LDW), lane keeping assist (LKA), high beam assist (HBA), autonomous emergency braking (AEB), traffic sign recognition (TSR), smart cruise control (SCC), blind spot detection (BSD), etc.

The DAS 100 may include a camera module 101 for acquiring image data around the vehicle 1 and a radar module 102 for acquiring object data around the vehicle 1.

The camera module 101 may include a camera 101a and an electronic control unit (ECU) 101b for capturing a view in front of the vehicle 1 and recognize other vehicles, pedestrians, cyclists, lanes, road signs, etc.

The radar module 102 may include a radar 102a and an ECU 102b for acquiring a relative position and relative speed of an object around the vehicle 1 (e.g., other vehicle, a pedestrian, a cyclist, etc.)

The electronic parts may communicate with one another through a vehicle communication network (NT). For example, the electronic parts may exchange data over Ethernet, Media Oriented Systems Transport (MOST), Flexray, Controller Area Network (CAN), Local Interconnect Network (LIN), etc. For example, the DAS 100 may send a driving control signal, a braking signal, and a steering signal to the EMS 11, the EBCM (31), and the EPS 41, respectively, over the NT.

Figure 2:
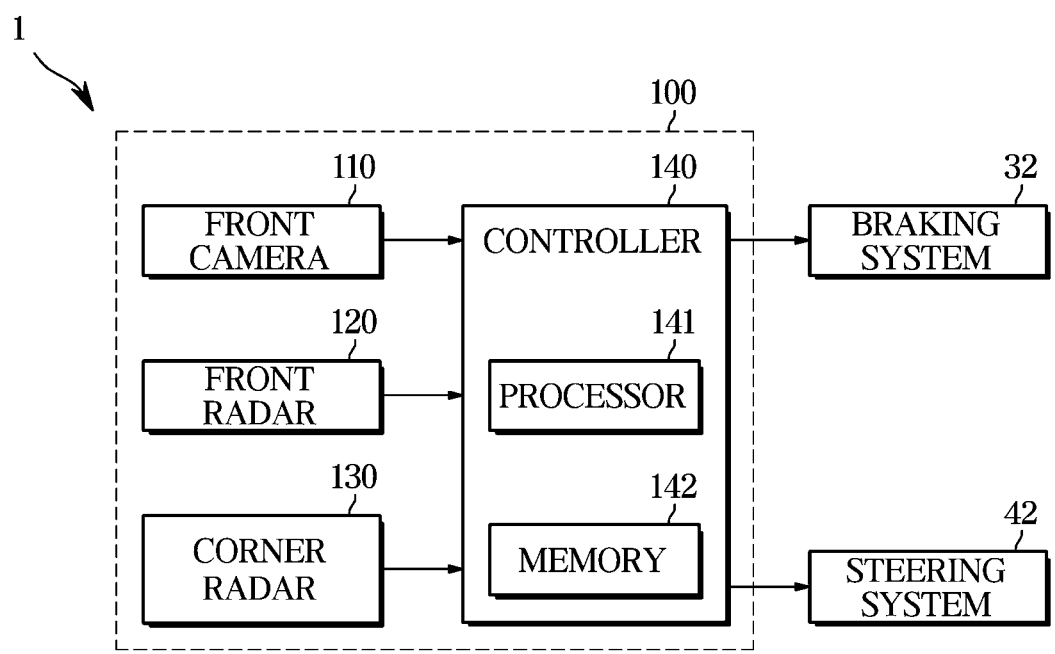
FIG. 2 is a block diagram of a driver assistance system, according to an embodiment of the present disclosure.
Figure 3:
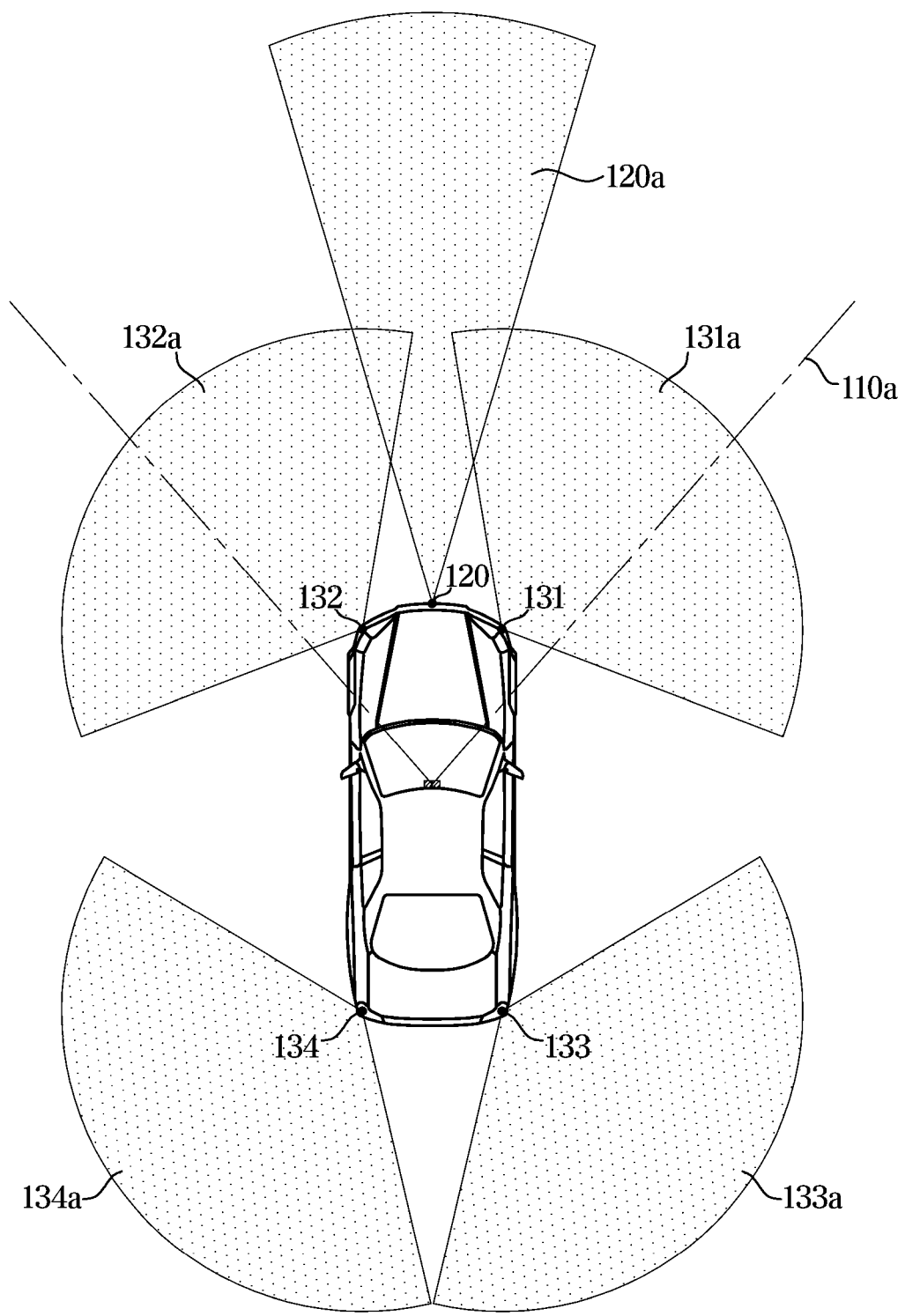
FIG. 3 shows a camera and radars included in a driver assistance system, according to an embodiment of the present disclosure.
Figure 4:
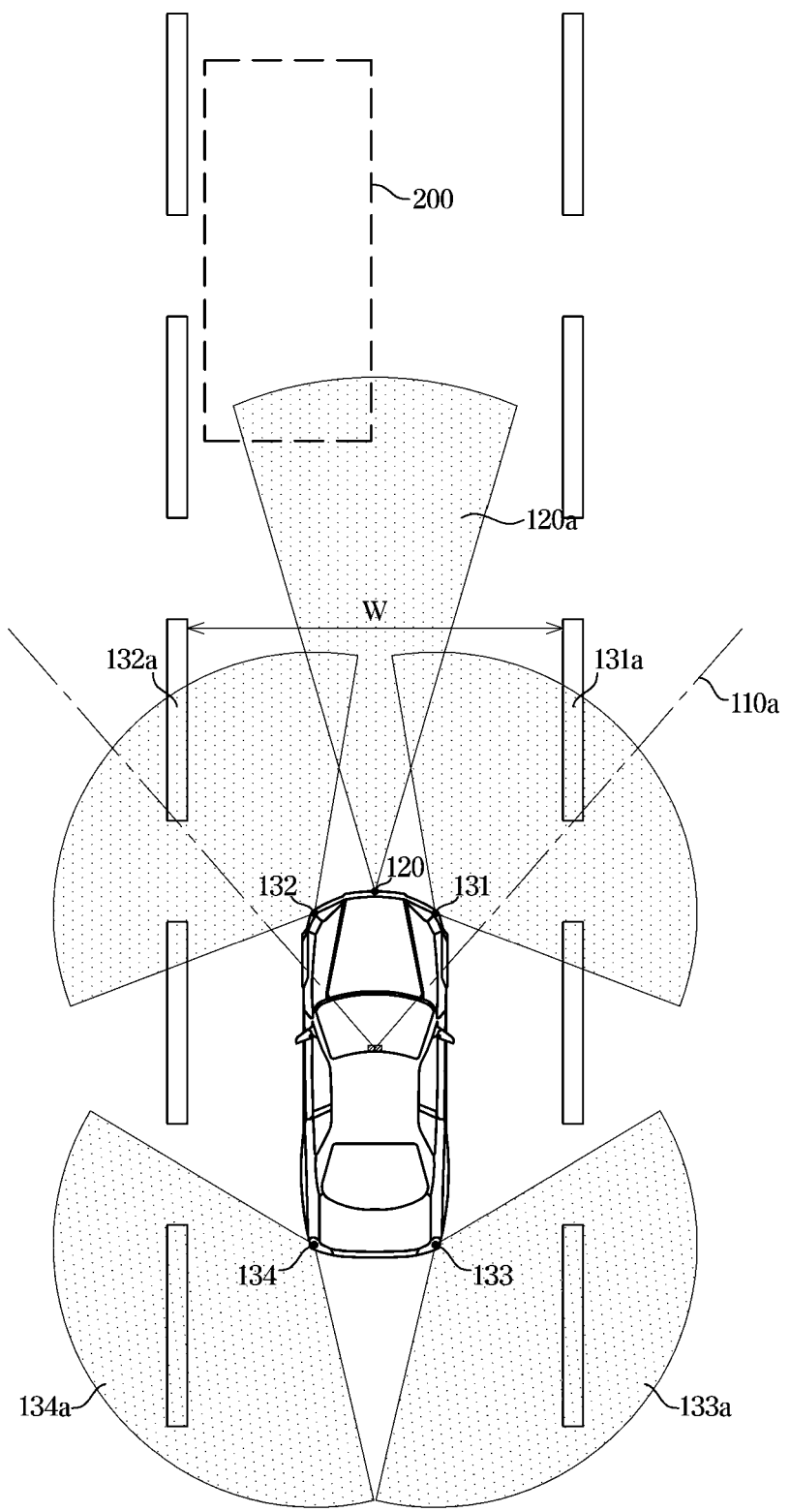
FIG. 4 is a schematic diagram for explaining how a vehicle equipped with a driver assistance system detects an obstacle in front, according to an embodiment of the present disclosure.

FIG. 2 is a block diagram of a DAS, according to an embodiment of the present disclosure. FIG. 3 shows a camera and radars included in a DAS, according to an embodiment of the present disclosure. FIG. 4 is a schematic diagram for explaining how a vehicle equipped with a DAS detects an obstacle in front, according to an embodiment of the present disclosure.

Referring to FIG. 2, the vehicle 1 may include a braking system 32, a steering system 42, and the DAS 100.

The braking system 32 may include the braking device 30 and the EBCM 31 as shown in FIG. 1, and the steering system 42 may include the steering device 40 and the EPS 41 as shown in FIG. 1.

Upon reception of a steering signal from the DAS 100, the steering system 42 may activate the steering device 40 and the EPS 41 to respond to the steering signal.

Specifically, the EPS 41 may generate torque for the EPS 41 driven by an electric motor in order to secure a yaw rate required.

The DAS 100 may include a front camera 110, a front radar 120, and a plurality of corner radars 130.

The front camera 110 may have a field of view 110a directed forward from the vehicle 1, as shown in FIG. 3. For example, the front camera 110 may be installed in the front windshield of the vehicle 1.

The front camera 110 may capture a view in front of the vehicle 1 and acquire the front image data of the vehicle 1. The front image data of the vehicle 1 may include position information of other vehicle, pedestrian, cyclist, or lane ahead of the vehicle 1.

The front camera 110 may include a plurality of lenses and image sensors. The image sensors may include a plurality of photo diodes for converting light to an electric signal, and the plurality of photo diodes may be arrayed in a two dimensional (2D) matrix.

The front camera 110 may be electrically coupled to a controller 140. For example, the front camera 110 may be coupled to the controller 140 over the NT, or through a hard wire, or via a printed circuit board (PCB).

The front camera 110 may send the front image data of the vehicle 1 to the controller 140.

The front radar 120 may have a field of sensing 120a directed forward from the vehicle 1, as shown in FIG. 3. The front radar 120 may be installed in the grille or bumper of the vehicle 1.

The front radar 120 may include a transmit antenna (or transmit antenna array) for radiating transmit waves forward from the vehicle 1, and a receive antenna (or receive antenna array) for receiving reflected waves that has reflected from an object. The front radar 120 may acquire front radar data from the transmit waves sent through the transmit antenna and the reflected waves received through the receive antenna. The front radar data may include information about a distance to and speed of other vehicle, pedestrian, or cyclist in front of the vehicle 1. The front radar 120 may calculate a relative distance to an object based on a difference in phase (or time) between the transmit wave and the reflected wave, and calculate relative speed of the object based on a difference in frequency between the transmit wave and the reflected wave.

The front radar 120 may be coupled to the controller 140 over the NT, or through a hard wire, or via a PCB. The front radar 120 may send the front radar data to the controller 140.

The plurality of corner radars 130 may include a first corner radar 131 installed at the front right corner of the vehicle 1, a second corner radar 132 installed at the front left corner of the vehicle 1, a third corner radar 133 installed at the rear right corner of the vehicle 1, and a fourth corner radar 134 installed at the rear left corner of the vehicle 1.

The first corner radar 131 may have a field of sensing 131*a* directed toward the front right direction from the vehicle 1, as shown in FIG. 3. The front radar 120 may be installed on the right side of the front bumper of the vehicle 1. The second corner radar 131 may have a field of sensing 132*a* directed toward the front left direction from the vehicle 1 and may be installed e.g., on the left side of the front bumper of the vehicle 1. The third corner radar 133 may have a field of sensing 133*a* directed toward the rear right direction from the vehicle 1 and may be installed e.g., on the right side of the rear bumper of the vehicle 1. The fourth corner radar 134 may have a field of sensing 134*a* directed toward the rear left direction from the vehicle 1 and may be installed e.g., on the left side of the rear bumper of the vehicle 1.

Each of the first to fourth corner radars 131 to 134 may include a transmit antenna and a receive antenna. The first to fourth corner radars 131 to 134 may acquire first to fourth corner radar data, respectively. The first corner radar data may include information about a distance to and speed of other vehicle, a pedestrian, or a cyclist (hereinafter, collectively called an 'object') located to the front right of the vehicle 1. The second corner radar data may include information about a distance to and speed of an object located to the front left of the vehicle 2. The third and fourth corner radar data may include information about distances to and speeds of objects located to the rear right and rear left of the vehicle 4, respectively.

Each of the first to fourth corner radars 131 to 134 may be coupled to the controller 140 over the NT, or through a hard wire, or via a PCB. The first to fourth corner radars 131 to 134 may send the first to fourth corner radar data to the controller 140, respectively.

The controller 140 may include the ECU 101*b* of the camera module 101 and/or the ECU 102*b* of the radar module 102, as shown in FIG. 1, and/or a separate incorporated controller.

The controller 140 may include a processor 141 and a memory 142.

The processor 141 may process the front image data of the front camera 110, the front radar data of the front radar 120, and the corner radar data of the plurality of corner radars 130, and create a braking signal and a steering signal to control the braking system 32 and the steering system 42, respectively. For example, the processor 141 may include an image signal processor for processing the front image data of the front camera 110, a digital signal processor for processing the radar data of the radars 120 and 130, and/or a micro control unit (MCU) for creating braking signals and steering signals.

The processor 141 may detect objects in front of the vehicle 1 (e.g., other vehicles, pedestrians, cyclists, etc.) based on the front image data of the front camera 110 and the front radar data of the front radar 120.

Specifically, the processor 141 may obtain information about positions (distances and directions) and speeds (relative speeds) of objects based on the front radar data of the front radar 120. The processor 141 may obtain information about a position (direction) of an object in front of the vehicle 1 and a type of the object (e.g., whether the object is other vehicle, a pedestrian, or a cyclist) based on the front image data of the front camera 110. For example, as shown in FIG. 4, information about a detected obstacle 200 may be obtained by obtaining information about the position (distance and direction) and speed (relative speed) of an object in front of the vehicle 1 based on the front radar data of the front radar 120 and obtaining information about a position (direction) of an object in front of the vehicle 1 and type of the vehicle (e.g., whether the object is other vehicle, a pedestrian, or a cyclist) based on the front image data of the front camera 110.

Furthermore, the processor 141 may match the objects detected based on the front image data to an object detected based on the front radar data, and based on the result of matching, obtain information about the type, position, and speed of the objects in front of the vehicle 1.

The processor 141 may create braking signals and steering signals based on the information about the type, position, and speed of the objects in front.

For example, the processor 141 may calculate time to collision (TTC) between the vehicle 1 and an object in front based on the information about the position (distance) and speed (relative speed) of the object, and may warn the driver of a collision or send a braking signal to the braking system 32 based on a result of comparison between the TTC and predetermined threshold time. In response to a TTC shorter than a first threshold time, the processor 141 may output an alert through an audio system and/or a display. In response to a TTC shorter than a second threshold time, the processor 141 may send a pre-braking signal to the braking system 32. In response to a TTC shorter than a third threshold time, the processor 141 may send an emergency braking signal to the braking system 32. The second threshold time is less than the first threshold time, and the third threshold time is less than the second threshold time.

In another example, the processor 141 may calculate a distance to collision (DTC) based on the information about speed (relative speed) of an object in front, and may warn the driver of a collision or send a braking signal to the braking system 32 based on a result of comparison between the DTC and a distance to the object.

In addition, the processor 141 may identify a lane, in which the vehicle 1 is traveling, based on the front image data of the front camera 110 and the front radar data of the front radar 120.

Specifically, as shown in FIG. 4, the processor 141 may identify a right line 131*a* and left line 132*a* to the vehicle 1, and identify width w between the right line 131*a* and the left line 132*a*.

The memory 142 may store programs and/or data for the processor 141 to process image data, to process radar data, and to create a braking signal and/or a steering signal. The memory 142 may temporarily store the image data received from the front camera 110 and/or the radar data received from the radars 120 and 130, and temporarily store results of processing the image data and/or the radar data by the processor 141.

The memory 142 may include volatile memories, such as Static Random Access Memories (S-RAMs), Dynamic RAMs (D-RAMs), or the like, and non-volatile memories, such as Read Only Memories (ROMs), Erasable Programmable ROMs (EPROMs), or the like.

Configuration of the DAS 100 was described above.

Embodiments of operation of the DAS 100 will now be described in detail. Specifically, FIG. 5 is a schematic view illustrating an occasion when an obstacle detected in FIG. 4 is an obstacle vehicle 500, and FIG. 6 is a schematic view illustrating an occasion when a detected obstacle is a pedestrian 600.

Figure 5:
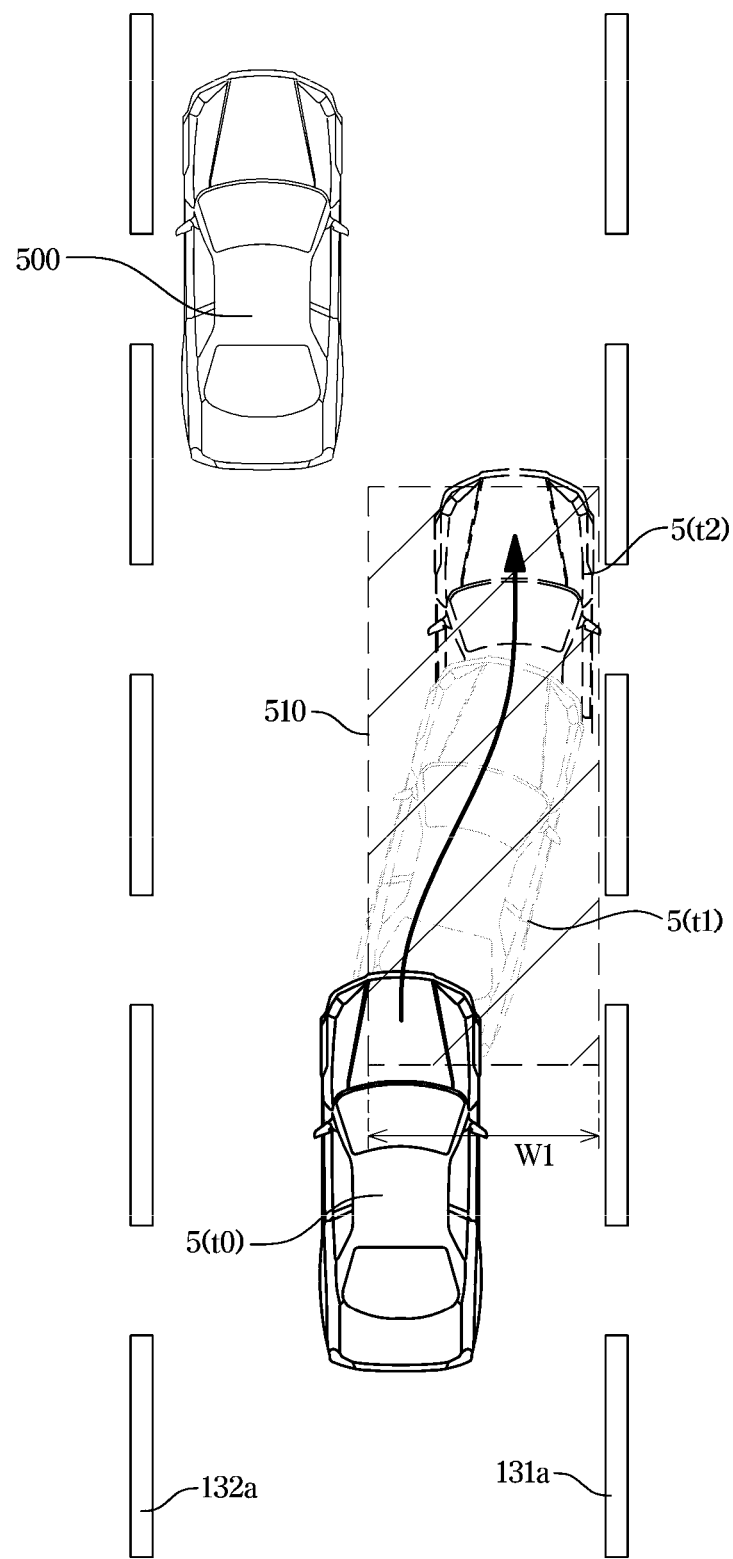
FIG. 5 is a schematic diagram for explaining how a vehicle equipped with a driver assistance system avoids a vehicle in front, according to an embodiment of the present disclosure.
Figure 6:
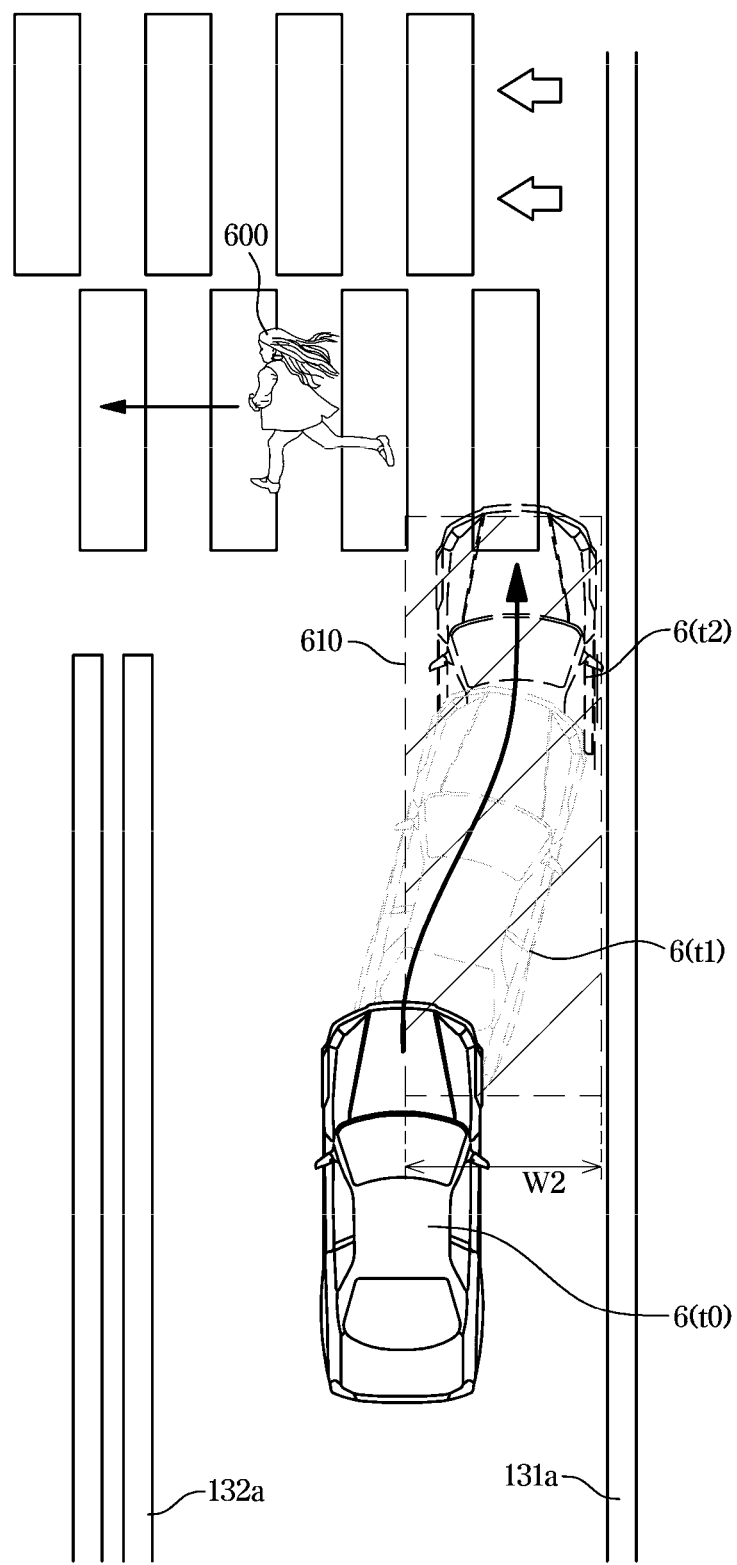
FIG. 6 is a schematic diagram for explaining how a vehicle equipped with a driver assistance system avoids a pedestrian, according to an embodiment of the present disclosure.

First, as shown in FIG. 5, the processor 141 may calculate TTC between the vehicle 1 and an object in front, which is the obstacle vehicle 500, based on the information about the position (distance) and speed (relative speed) of the object, warn the driver of a collision or send a braking signal to the braking system 32 based on a result of comparison between the TTC and predetermined threshold time, and determine whether it is possible to avoid the collision only by braking control.

Specifically, the processor 141 may calculate TTC with the obstacle vehicle 500 detected when the vehicle 1 is located at 5 (t0), and if determining that it is impossible to avoid the collision only by braking control of the braking system 32, send a steering signal to the steering system 42 and additionally perform steering control to avoid the collision.

Accordingly, if the processor 141 determines that it is impossible to avoid a collision with the obstacle vehicle 500 only by the braking control of the braking system 32, the processor 141 may send a steering signal to the steering system 42 and control the steering system 42 to perform lateral control for the vehicle 1 to avoid the obstacle vehicle 500 at point 5 (t1).

The lateral control of the steering system 42 is to control a steering angle to prevent the vehicle 100 from deviating from a range that does not exceed an area 510 determined in advance not to cross the detected lines 131*a* and 132*a*. Specifically, the area 510 determined in advance by the processor 141 may correspond to an area having width w1, within which the vehicle 1 may avoid the obstacle vehicle 500 between the detected lines 131*a* and 132*a*, and length, which is a longitudinal distance for the vehicle 100 to avoid a collision with the obstacle vehicle 500 from a starting point of the lateral direction. The steering system 42 may generate torque for the EPS 41 driven by an electric motor to secure a required yaw rate, based on the steering control signal sent by the processor 141 to the steering system 42.

Subsequently, the processor 141 may continue to send braking signals to the braking system 32 in order for the vehicle 1 not to deviate the predetermined area 510, and at the same time, keep performing steering control by sending steering signals to the steering system 42 to avoid the obstacle vehicle 500 in front of the vehicle 1 without a collision. Specifically, the steering system 42 may calculate torque for the EPS 41 driven by an electric motor to secure a required yaw rate, based on the steering control signal sent by the processor 141 to the steering system 42.

FIG. 6 shows how to avoid a collision with an obstacle in front, which is a pedestrian, according to an embodiment.

First, as shown in FIG. 6, the processor 141 may calculate TTC between the vehicle 1 and an object in front, which is the pedestrian 600, based on the information about the position (distance) and speed (relative speed) of the object, warn the driver of a collision or send a braking signal to the braking system 32 based on a result of comparison between the TTC and predetermined threshold time, and determine whether it is possible to avoid the collision only by braking control.

Specifically, the processor 141 may calculate TTC with the pedestrian 600 detected when the vehicle 1 is located at 6 (t0), and if determining that it is impossible to avoid the collision only by braking control of the braking system 32, send a steering signal to the steering system 42 and additionally perform steering control to avoid the collision.

Accordingly, if the processor 141 determines that it is impossible to avoid a collision with the pedestrian 600 only by the braking control of the braking system 32, the processor 141 may send a steering signal to the steering system 42 and control the steering system 42 to perform lateral control for the vehicle 1 to avoid the pedestrian 600 at point 6 (t1). Specifically, the steering system 42 may calculate torque for the EPS 41 driven by an electric motor to secure a required yaw rate, based on the steering control signal sent by the processor 141 to the steering system 42.

The lateral control of the steering system 42 is to control a steering angle to prevent the vehicle 100 from deviating from a range that does not exceed an area 610 determined in advance not to cross the detected lines 131*a* and 132*a*. Specifically, the area 610 determined in advance by the processor 141 may correspond to an area having width w2, within which the vehicle 1 may avoid the pedestrian 600 between the detected lines 131*a* and 132*a*, and length, which is a longitudinal distance for the vehicle 100 to avoid a collision with the pedestrian 600, from a starting point of the lateral direction.

Subsequently, the processor 141 may continue to send braking signals to the braking system 32 in order for the vehicle 1 not to deviate the predetermined area 610, and at the same time, keep performing steering control by sending steering signals to the steering system 42 to avoid the pedestrian 600 in front of the vehicle 1 without a collision. Specifically, the steering system 42 may continue to calculate torque for the EPS 41 driven by an electric motor to secure a required yaw rate, based on the steering control signal sent by the processor 141 to the steering system 42.

Figure 7:
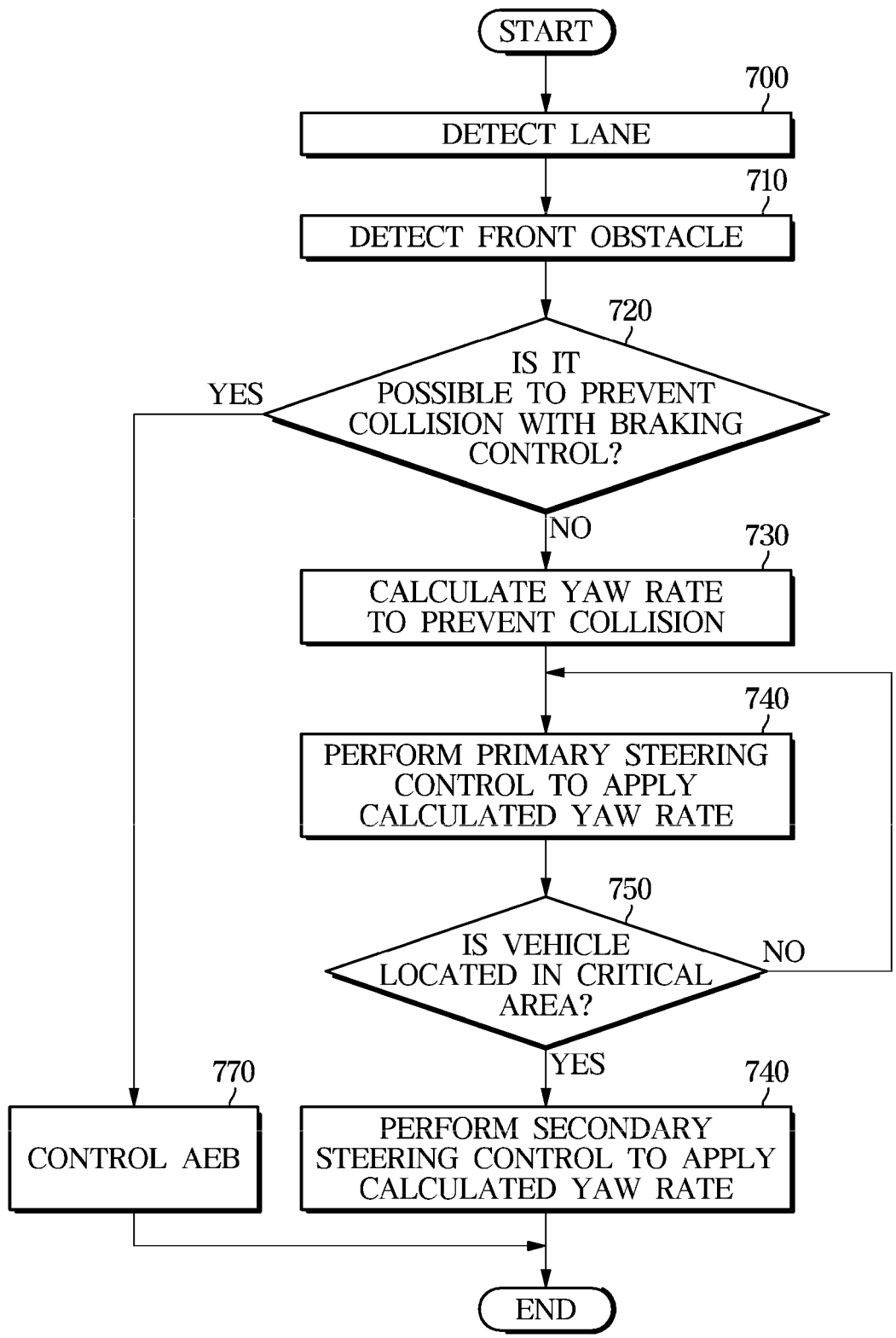
FIG. 7 is a flowchart illustrating an operation method of a driver assistance system, according to an embodiment of the present disclosure.

FIG. 7 is a flowchart illustrating an operation method of a driver assistance system, according to an embodiment of the present disclosure.

Referring to FIG. 7, the DAS 100 detects a lane in which the vehicle 1 is traveling, in 700. The DAS 100 detects an obstacle in front of the vehicle 1, in 710.

The controller 140 may receive image data and/or radar data received from the front camera 110 and/or the front radar 120.

The controller 140 may detect a lane in which the vehicle 1 is traveling based on the image data and/or radar data, and detect other vehicle, a pedestrian, or a cyclist in front of the vehicle 1 based on the image data and/or radar data. For example, the controller 140 may obtain information about a type, a position (distance and direction), relative speed of other vehicle, a pedestrian, or a cyclist in front of the vehicle 1 based on the image data and/or the radar data. The DAS 100 may predict whether the vehicle 1 will collide with an obstacle in front based on the position (distance and direction) and relative speed of the obstacle.

For example, the controller 140 may calculate TTC with an object in front based on the position and relative speed of the object, and predict whether the vehicle 1 will collide with the object based on comparison between the TTC and a predetermined threshold. The controller 140 may receive radar data from the plurality of corner radars 130, and detect an object located to a side (front right, front left, rear right, or rear left) of the vehicle 1 based on the radar data. For example, the controller 140 may obtain the position (distance and direction) and relative speed of the object to the side based on the radar data.

If a collision may be avoided by braking control in 720, the DAS 100 sends a braking signal to the braking system 32 of the vehicle 1 to avoid a collision between the vehicle and an object with the AEB, in 770.

Otherwise, if the DAS 100 determines that it is difficult to avoid the collision only by the braking control in 720, the controller 140 calculates a required yaw rate to avoid the collision in 730.

The DAS 100 performs primary steering control with the steering system 42 by sending a steering signal to the steering system 42 to produce the calculated yaw rate.

The primary steering control refers to steering control to secure a yaw rate required for the vehicle 1 to avoid a collision with an obstacle.

After this, it is determined whether a result of the primary steering control puts the vehicle 1 in a critical area in 750. The critical area refers to an area having width, in which the vehicle 1 may avoid a collision with the obstacle in the detected lane from a starting point of the lateral direction, and length, which is a longitudinal distance for the vehicle 1 to avoid a collision from the starting point of the lateral direction.

If the result of the primary steering control fails to put the vehicle 1 in the critical area, the motor of the steering device continues to be controlled to secure a yaw rate by the steering system 42.

Otherwise, if the result of the primary steering control puts the vehicle 1 in the critical area in 750, secondary steering control is performed to produce the calculated yaw rate in 740. The secondary steering control refers to steering control to secure a yaw rate required for the vehicle 1 to avoid a collision with an obstacle while keeping the lane.

According to an embodiment of the present disclosure, a driver assistance system may enable lateral control of a vehicle to be performed along with braking control when there is an obstacle in front and it is impossible to avoid the obstacle only with the braking control, thereby reducing the risk of colliding with the obstacle.

Furthermore, secondary collisions with nearby vehicles on other lanes, which might occur in an attempt to avoid the obstacle, may be prevented by lateral control of a vehicle in a lane.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A driver assistance system comprising:
   a first sensor installed at a vehicle and configured to have a field of view directed forward from the vehicle to acquire front image data;
   a second sensor selected from a group of radar and LIDAR sensors, installed at the vehicle, and configured to have a field of view directed forward from the vehicle to acquire front detection data; and
   a controller having a processor configured to process the front image data and the front detection data,
   wherein the controller is configured to:
      detect a lane, in which the vehicle is traveling, or detect a front object located in front of the vehicle, in response to the processing of the image data and the front detection data,
      determine a predetermined area which is narrower than an area having a width of the lane and a length of a distance between the vehicle and the front object,
      output a braking signal to a braking system of the vehicle to control the braking system to perform braking control, when a collision between the vehicle and the front object is expected at time t0,
      output a steering signal to a steering system of the vehicle to control the steering system to perform primary steering control until the vehicle is in the predetermined area and continue to output the braking signal to the braking system to continuously control the braking system to perform the braking control, when a collision between the vehicle and the front object is expected even with braking control at time t1 after t0, and
      after the vehicle is in the predetermined area, output another steering signal to the steering system of the vehicle to control the steering system to perform secondary steering control to avoid a collision with the front object while keeping the vehicle in the lane.

2. The driver assistance system of claim 1, wherein the controller is configured to, when a collision between the vehicle and the front object is expected, output the steering signal to the steering system of the vehicle in order for the vehicle to avoid the collision with the front object and stay in the lane, in which the vehicle is traveling.

3. The driver assistance system of claim 1, wherein the controller is configured to calculate a yaw rate required for the vehicle to avoid a collision with the front object and stay in the lane, in which the vehicle is traveling.

4. The driver assistance system of claim 3, wherein the controller is configured to output the steering signal to the steering system of the vehicle and output the braking signal to the braking system of the vehicle, in order for the vehicle to avoid a collision with the front object and stay in the predetermined area in the lane, in which the vehicle is traveling.

5. The driver assistance system of claim 1, wherein the controller is configured to calculate a yaw rate in real time, the yaw rate being required for the vehicle to travel to stay in the predetermined area.

6. The driver assistance system of claim 5, wherein the controller is configured to output the steering control signal changed according to the yaw rate calculated in real time to the steering system.

7. The driver assistance system of claim 6, wherein the controller is configured to expect a collision between the vehicle and the front object based on a distance to the front object and relative speed of the front object.

8. A driver assistance method comprising:
   using a camera installed at a vehicle and having a field of view directed forward from the vehicle to acquire front image data of the vehicle;
   using a front radar installed at the vehicle and having a field of view directed forward from the vehicle to acquire front radar data of the vehicle;
   detecting a lane, in which the vehicle is traveling, or detecting a front object located in front of the vehicle, in response to processing of the image data and the front radar data;

determining a predetermined area which is narrower than an area having a width of the lane and a length of a distance between the vehicle and the front object, putting a brake on the vehicle when a collision between the vehicle and the front object is expected at time t0;

performing primary steering control of the vehicle until the vehicle is in the predetermined area and continuing to put the brake on the vehicle, when a collision between the vehicle and the front object is expected even with the braking of the vehicle at time t1 after t0; and after the vehicle is in the predetermined area, performing secondary steering control of the vehicle to avoid a collision with the front object while keeping the vehicle in the lane.

9. The driver assistance method of claim 8, further comprising: when a collision between the vehicle and the front object is expected, changing a traveling direction of the vehicle to avoid the collision with the front object and stay in the lane, in which the vehicle is traveling.

10. The driver assistance method of claim 8, further comprising: calculating a yaw rate required for the vehicle to avoid a collision with the front object and stay in the lane, in which the vehicle is traveling.

11. The driver assistance method of claim 10, further comprising: changing a traveling direction of the vehicle and putting the brake on the vehicle, in order for the vehicle to avoid a collision with the front object and stay in the predetermined area in the lane, in which the vehicle is traveling.

12. The driver assistance method of claim 11, further comprising: calculating a yaw rate in real time, the yaw rate being required for the vehicle to travel to stay in the predetermined area.

13. The driver assistance method of claim 12, further comprising: outputting a steering control signal changed according to the yaw rate calculated in real time to a steering system.

14. The driver assistance method of claim 13, further comprising: expecting a collision between the vehicle and the front object based on a distance to the front object and relative speed of the front object.

15. A driver assistance system comprising:
a first sensor installed at a vehicle and configured to have a field of view directed forward from the vehicle to acquire front image data;
a second sensor selected from a group of radar and LIDAR sensors, installed at the vehicle, and configured to have a field of view directed forward from the vehicle to acquire front detection data;
a processor configured to process the front image data and the front detection data; and
a memory storing instructions which, when executed by the processor, cause the processor to:
detect a lane, in which the vehicle is traveling, or detect a front object located in front of the vehicle, in response to the processing of the image data and the front detection data,
determine a predetermined area which is narrower than an area having a width of the lane and a length of a distance between the vehicle and the front object,
output a braking signal to a braking system of the vehicle to control the braking system to perform braking control, when a collision between the vehicle and the front object is expected at time t0,
output a steering signal to a steering system of the vehicle to control the steering system to perform primary steering control until the vehicle is in the predetermined area and continue to output the braking signal to the braking system to continuously control the braking system to perform the braking control, when a collision between the vehicle and the front object is expected even with braking control at time t1 after t0,
after the vehicle is in the predetermined area, output another steering signal to the steering system of the vehicle to control the steering system to perform secondary steering control to avoid a collision with the front object while keeping the vehicle in the lane.

16. The driver assistance system of claim 15, wherein the instructions further cause the processor to, when a collision between the vehicle and the front object is expected, output the steering signal to the steering system of the vehicle in order for the vehicle to avoid the collision with the front object and stay in the lane, in which the vehicle is traveling.

17. The driver assistance system of claim 16, wherein the instructions further cause the processor to output the steering signal to the steering system of the vehicle and output the braking signal to the braking system of the vehicle, in order for the vehicle to avoid a collision with the front object and stay in the predetermined area in the lane, in which the vehicle is traveling, the predetermined area is narrower than an area having width of the lane and length of a distance between the vehicle and the front object.

18. The driver assistance system of claim 17, wherein the instructions further cause the processor to calculate a yaw rate in real time, the yaw rate being required for the vehicle to travel to stay in the predetermined area.

19. The driver assistance system of claim 18, wherein the instructions further cause the processor to output the steering control signal changed according to the yaw rate calculated in real time to the steering system.

* * * * *